(12) United States Patent
Walters et al.

(10) Patent No.: US 11,776,073 B2
(45) Date of Patent: Oct. 3, 2023

(54) TECHNOLOGIES FOR DYNAMICALLY DISPATCHING GENERATOR POWER

(71) Applicant: LEADING EDGE POWER SOLUTIONS, LLC, Laguna Beach, CA (US)

(72) Inventors: David Walters, Laguna Beach, CA (US); Richard Paulsen, Laguna Beach, CA (US)

(73) Assignee: LEADING EDGE POWER SOLUTIONS, LLC, Laguna Beach, CA (US)

( * ) Notice: Subject to any disclaimer, the term of this patent is extended or adjusted under 35 U.S.C. 154(b) by 0 days.

(21) Appl. No.: 17/581,729

(22) Filed: Jan. 21, 2022

(65) Prior Publication Data

US 2022/0148101 A1 May 12, 2022

Related U.S. Application Data

(63) Continuation of application No. 16/799,468, filed on Feb. 24, 2020, now Pat. No. 11,244,410.

(51) Int. Cl.
*G06Q 50/06* (2012.01)
*G05F 1/66* (2006.01)
*G05B 15/02* (2006.01)

(52) U.S. Cl.
CPC ............ *G06Q 50/06* (2013.01); *G05B 15/02* (2013.01); *G05F 1/66* (2013.01)

(58) Field of Classification Search
CPC ............ G06Q 50/06; G05B 15/02; G05F 1/66
See application file for complete search history.

(56) References Cited

U.S. PATENT DOCUMENTS

| 5,684,710 A | * | 11/1997 | Ehlers | H02J 13/00028 307/115 |
| 6,583,521 B1 | | 6/2003 | Lagod et al. | |
| 8,588,991 B1 | * | 11/2013 | Forbes, Jr. | G05B 19/042 700/297 |

(Continued)

FOREIGN PATENT DOCUMENTS

KR 101904902 B1 10/2018

OTHER PUBLICATIONS

International Application No. PCT/US2021/019320, International Search Report and Written Opinion, dated Jun. 16, 2021.

(Continued)

*Primary Examiner* — Ramesh B Patel
(74) *Attorney, Agent, or Firm* — MARSHALL, GERSTEIN & BORUN LLP

(57) ABSTRACT

Systems and methods for determining how to dispatch power to a property from a generator are provided. According to certain aspects, a controller associated with the generator may retrieve or access a set of data indicating time of use rates associated with utility power, performance characteristics of the generator, and/or energy usage data. Based on the data, the controller may determine a set point corresponding to when it may be beneficial to dispatch generator power to the property instead of utility power. At the set point, the controller may facilitate supplementing power from utility power with power from the generator. Additionally, the controller may collect usage and performance data associated with dispatch of the generator power.

20 Claims, 4 Drawing Sheets

(56) References Cited

U.S. PATENT DOCUMENTS

| | | | |
|---|---|---|---|
| 9,251,479 B2 | 2/2016 | Sun et al. | |
| 2010/0088261 A1* | 4/2010 | Montalvo | H02J 3/144 |
| | | | 700/297 |
| 2011/0015802 A1* | 1/2011 | Imes | G05D 23/1923 |
| | | | 700/300 |
| 2011/0231028 A1 | 9/2011 | Ozog | |
| 2012/0101653 A1* | 4/2012 | Tran | G01D 4/004 |
| | | | 700/296 |
| 2013/0345888 A1* | 12/2013 | Forbes, Jr. | H04L 67/10 |
| | | | 700/291 |
| 2014/0049109 A1 | 2/2014 | Kearns et al. | |
| 2014/0277788 A1* | 9/2014 | Forbes, Jr. | H02J 13/00028 |
| | | | 700/286 |
| 2017/0025860 A1* | 1/2017 | Forbes, Jr. | H02J 3/38 |
| 2017/0070069 A1 | 3/2017 | Li et al. | |
| 2018/0159332 A1 | 6/2018 | Derksen | |
| 2018/0246536 A1* | 8/2018 | Forbes, Jr. | H02J 3/00 |
| 2021/0264543 A1* | 8/2021 | Walters | G05F 1/66 |
| 2022/0148101 A1* | 5/2022 | Walters | G05B 15/02 |

OTHER PUBLICATIONS

European Patent Application No. 21761548.3, Extended European Search Report, dated Jul. 6, 2023.

\* cited by examiner

TECHNOLOGIES FOR DYNAMICALLY DISPATCHING GENERATOR POWER

CROSS-REFERENCE TO RELATED APPLICATIONS

This application is a continuation of U.S. patent application Ser. No. 16/799,468, now U.S. Pat. No. 11,244,410, filed Feb. 24, 2020, the disclosure of which is hereby incorporated by reference in its entirety.

FIELD

The present disclosure is directed to power management. More particularly, the present disclosure is directed to platforms and technologies for determining conditions for dispatching electric power from an electric generator to at least partially replace utility power.

BACKGROUND

In many areas and jurisdictions, properties receive energy or power from electric utility providers, where the electric power may be regulated, generated, and distributed via existing infrastructure. Generally, an owner or tenant of each property pays an electric utility provider for an amount of power used over a specific time period. Alternative forms of electric power also exist. For example, some properties have solar panels which convert sunlight into electric power to replace or supplement utility electric power.

However, both conventional utility electric power and alternative forms of power have associated costs, including metered costs, installation costs, and/or other extraneous or related costs. In some situations, these costs may consistently vary based on certain factors. For example, utility electric power may have different rates based on the time of day, day of week, and/or time of year, which may be set and adjusted by the utility provider. Therefore, it is difficult if not impossible for individuals to accurately predict or assess which form of electric power will be most cost effective at a point in time or across any given time period.

Accordingly, there is an opportunity for systems and methods to determine how and when to dispatch or resume different forms of electric power in a cost effective manner.

SUMMARY

A computer-implemented method of determining how to dispatch energy from an electric generator for a customer may be provided. The method may include: accessing (i) a set of historical energy usage data associated with the customer, and (ii) a set of performance characteristics of the electric generator, determining, by a controller based on the set of historical energy usage data and the set of performance characteristics, a set point to dispatch power from the electric generator, accessing utility metered load data associated with the customer, determining, by the controller based on the utility metered load data, to dispatch the power from the electric generator according to the set point, causing the electric generator to dispatch the power according to the set point, collecting, by the controller when the electric generator is dispatching the power, (i) a set of performance data associated with the electric generator, and (ii) usage load data associated with the electric generator, and transmitting, via a transceiver to a server computer, the set of performance data and the usage load data.

In an embodiment, an electric generator may be provided. The electric generator may include a memory storing a set of performance characteristics associated with the electric generator, a transceiver configured to communicate with a server via at least one network connection, and a controller interfaced with the memory and the transceiver. The controller may be configured to: access, via the transceiver, at least one of: a set of historical energy usage data associated with a customer, or a set of time-of-use rates associated with utility power, determine, based on the set of performance characteristics and the at least one of the set of historical energy usage data or the set of time-of-use rates, a set point to dispatch power from the electric generator, access utility metered load data associated with the customer, determine, based on the utility metered load data, to dispatch the power from the electric generator according to the set point, dispatch the power according to the set point, collect a set of performance data associated with dispatching the power, and transmit, via the transceiver, the set of performance data.

In another embodiment, a computer-implemented method of dispatching energy from an electric generator for a customer may be provided. The method may include: accessing (i) a set of time-of-use rates associated with utility power, and (ii) a set of performance characteristics of the electric generator; determining, by a controller of the electric generator based on the set of time-of-use rates and the set of performance characteristics, a set point to dispatch power from the electric generator; at the set point, causing the electric generator to dispatch the power; and collecting, by the controller when the electric generator is dispatching the power, a set of performance data associated with the electric generator.

DETAILED DESCRIPTION

Figure 1A:
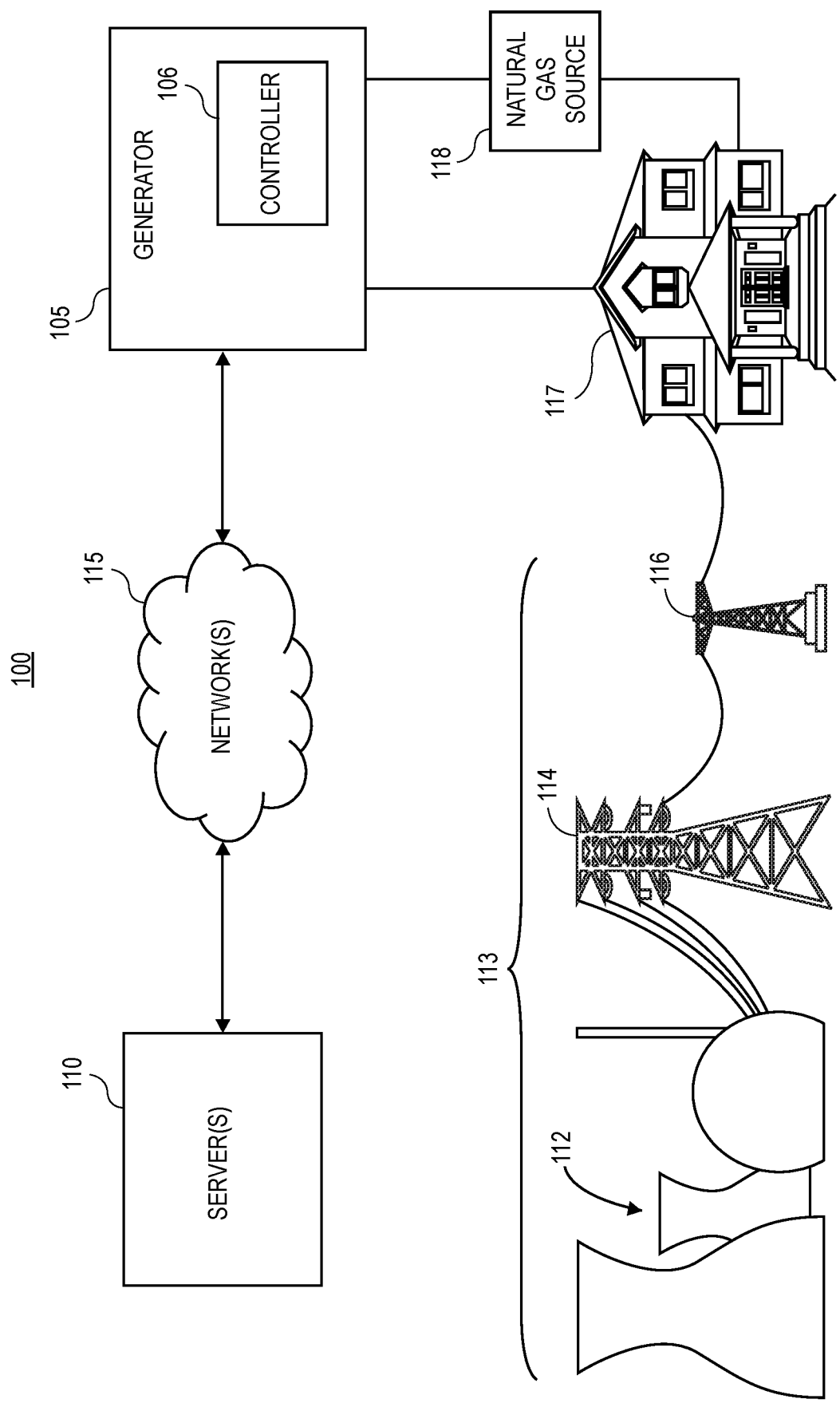
FIG. 1A depicts a diagram of an exemplary system for generating and distributing electric power in multiple ways, in accordance with some embodiments.

The present embodiments may relate to, inter alia, systems and methods for determining when and how to dispatch power, from an electric generator, to supply to a property. According to certain aspects, a property may be equipped with conventional utility electric power and may also be configured with an electric generator that may facilitate various functionalities of the claimed systems and methods. Generally, the systems and methods may determine when it may be beneficial to at least supplement utility electric power with power from the electric generator. It should be appreciated that the systems and methods also contemplate replacing utility electric power with power from the electric generator in certain instances (e.g., during a power outage). In these instances, the systems and methods may sense an outage and transfer from a grid parallel model to a grid independent mode, and the electric generator may serve as a host load according to the size of the electric generator through a panel of breakers.

In particular, the generator may be configured with a controller that may monitor or access certain data to determine when it may be beneficial to cease utility electric power and instead dispatch power from the generator. For example, it may be more cost efficient to dispatch power from the generator at certain times of day, days of the week, times of the year, etc. The controller may additionally account for past and/or estimated power usage by an individual(s)/customer(s) associated with the property. Further, when the generator is supplying electric power to the property, the controller may collect usage and performance data associated with usage of the generator, and transmit the collected data to a server for analysis and to be used for operational improvements associated with the generator.

The systems and methods therefore offer numerous benefits. In particular, the systems and methods determine when it is beneficial to dispatch power from the generator, where the customers or individuals associated with the properties may take advantage of the benefits. For example, the customers or individuals may see cost savings associated with consumption of electric power from the generator versus utility electric power. Additionally, the systems and methods may collect and analyze usage and performance data that may be used to improve performance of the generator. Further, usage of the generator results in the customers or individuals being less reliant on "the grid," and may therefore experience fewer or zero power outages, and may also result in a reduced amount of instances of accidents and disasters that are caused by the electric utility grid. Moreover, the systems and methods may promote efficiencies in electric power usage which may improve the environment. It should be appreciated that other benefits are envisioned.

The systems and methods discussed herein address a challenge that is particular to power management. In particular, the challenge relates to a difficulty in determining how and when to manage the delivery of electric power from multiple sources. This is particularly apparent with the increasing amount of sources of power that may be employed by a property. In conventional environments, consumers actively and explicitly facilitate actions to switch and/or combine power sources, either permanently or in response to certain triggers, without an accurate idea on the present and future costs of such switches and/or combinations. In contrast, the systems and methods examine and analyze certain data to automatically determine when it is financially beneficial to supplement utility power with electric generator power, and facilitate power dispatches accordingly. Therefore, because the systems and methods employ the collection, analysis, and storing of data associated with power management, the systems and methods are necessarily rooted in computer technology in order to overcome the noted shortcomings that specifically arise in the realm of power management.

Similarly, the systems and methods provide improvements in a technical field, namely, power management. Instead of the systems and methods merely being performed by hardware components using basic functions, the systems and methods employ complex steps that go beyond the mere concept of simply retrieving and combining data using a computer. In particular, the hardware components retrieve or access power-related data, analyze the data to determine how to effectively dispatch power from various power sources, and facilitate the dispatch of the power. This combination of elements further impose meaningful limits in that the operations are applied to improve power management by associating and analyzing multiple types of distinct data in a meaningful and effective way.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a utility power infrastructure 113 that may be configured to supply utility power to a property 117. Therefore, the property 117 may be considered to be on the utility "electrical grid." Although depicted as a house in FIG. 1, the property 117 may be any type of physical structure (e.g., commercial building, townhouse, condo/condo building, apartment/apartment building, etc.) configured for the delivery of utility electric power. Additionally, a single property 117 is depicted in FIG. 1, however it should be appreciated that additional properties may be configured to receive utility power.

The utility power infrastructure 113 may include one or more generating stations 112, a set of high voltage transmission lines 114, and a set of additional transmission lines 116. Although not depicted in FIG. 1, the utility power infrastructure 113 may further include additional elements and components as conventionally implemented, for example a set of step-up substations, a set of step-down substations, a set of step-down transformers, and/or others. The generation station(s) 112 may employ any type or combination of types of power generation, such as coal, nuclear, solar, wind, natural gas, and/or the like. Generally, the utility power infrastructure 113 may comprise multiple sets of generating stations 112, high voltage transmission lines 114, additional transmission lines 116, and/or other components installed or located at various locations, where certain portions of the utility power infrastructure 113 supply electric utility power to certain properties, neighborhoods, areas, and/or the like.

Generally, the utility power generated by the generation station(s) 112 is transmitted to the property 117 via the set of high voltage transmission lines 114, the set of additional transmission lines 116, and the other components, where all or portions of the utility power infrastructure 113 may be managed by one or more utility providers. An individual(s) or customer(s) associated with the property 117 (e.g., an owner of the property) may be signed up or registered for receiving the utility power as managed by the utility provider. Thus, the customer(s) may have an account with the utility provider and may pay for the utility power on a periodic basis (e.g., monthly) according to how much utility power the property 117 actually uses or is estimated to use.

The system 100 may further include a generator 105 that may be physically connected to a natural gas source 118. According to embodiments, the natural gas source 118 may be associated with an additional utility used by the property 117 and managed by a utility provider (which may be the same or different utility provider that manages the utility power infrastructure 113). For example, the property 117 may receive electric utility power through an electric utility provider and natural gas service through a natural gas utility provider. The generator 105 may be configured to generate electric power using the natural gas source 118, and store the electric power for deployment to the property 117. Thus, the property 117 may receive power from the utility power infrastructure, from the generator 105, or from a combination thereof. The generator 105 may be configured with a controller 106 that may be configured to manage and facilitate operation of the generator 105 and its dispatch of power to the property 117.

The system 100 may additionally include one or more servers 110 that may communicate with various components of the generator 105 (e.g., the controller 106) via one or more networks 115. The server(s) 110 may be associated with an entity such as a utility provider, company, business, corporation, or the like, which manages policies, accounts, data or the like associated with usage of the generator 105 and/or usage of the utility power infrastructure 113. In particular, the server 110 may be associated with a company that analyzes, stores, and avails data that enables the controller 106 to improve efficiency associated with usage of the generator 105. Additionally or alternatively, the server 110 may be associated with the utility provider that manages the utility power infrastructure 113. It should be appreciated that the generator 105 may interface and communicate with multiple servers 110 respectively associated with multiple entities, companies, utility providers, and/or the like. The network(s) 115 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others).

In operation, the controller 106 may access data indicative of past, current, and/or estimated future power usage, utility costs, and/or the like, and may determine when it may be beneficial (e.g., cost effective) to dispatch power from the generator 205 to the property 117, which in effect transitions (partially or fully) the property from receiving power via the utility power infrastructure 113 to receiving power from the generator 105. The controller 106 may collect usage and performance data in association with power being dispatched from the generator 105, and transmit the usage and performance data to the server(s) 110 via the network(s) 115, where the network(s) 115 may analyze the usage and performance data, and determine various metrics, trends, predictions, and/or the like, and generally determine how to improve operation of the generator 105. It should be appreciated that the controller 106 may additionally or alternatively perform these determinations based on the collected usage and performance data. These functionalities are described in more detail with respect to FIG. 2 and other subsequent figures and descriptions.

Figure 1B:
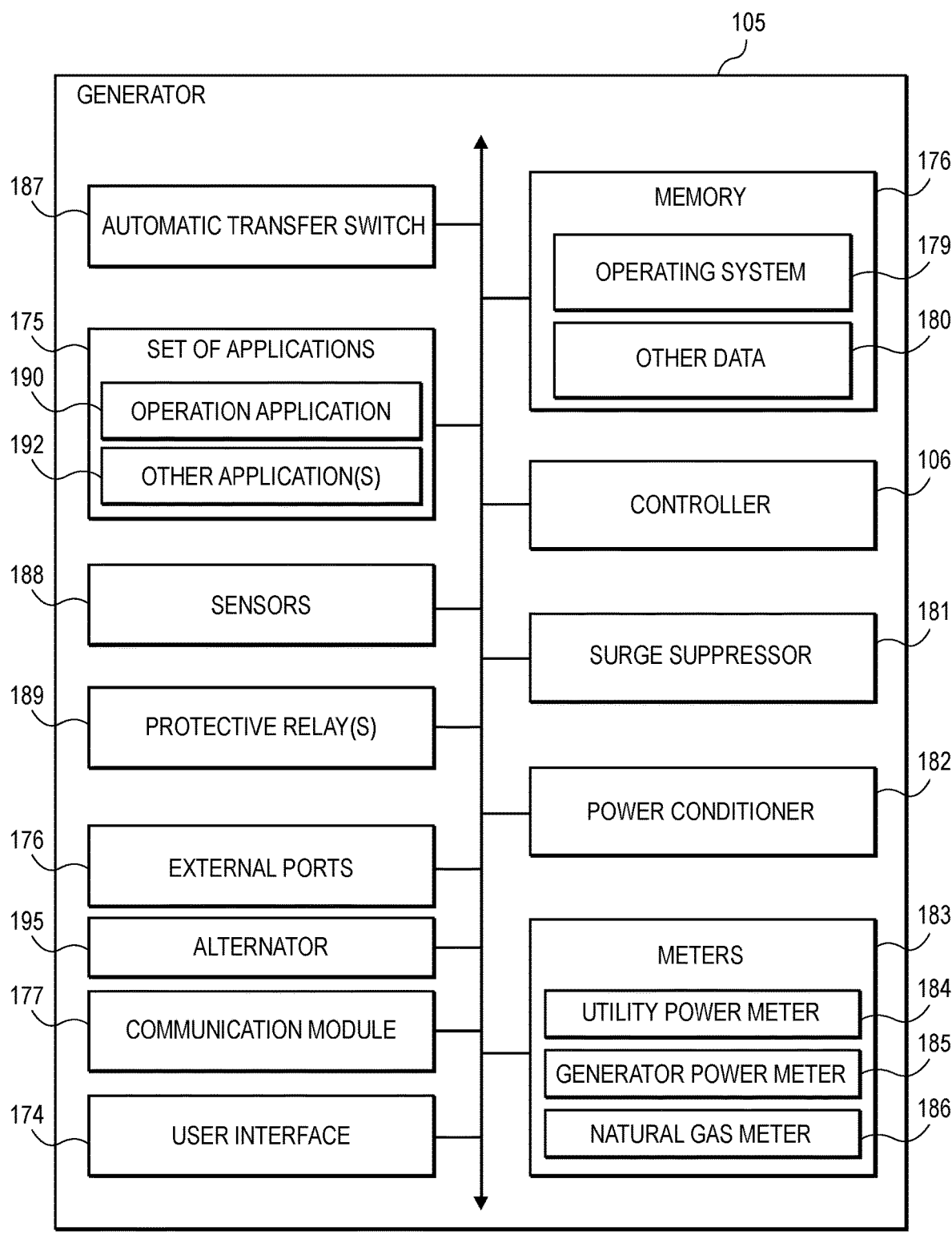
FIG. 1B depicts a hardware diagram of an electric generator and components thereof, in accordance with some embodiments.

FIG. 1B illustrates a hardware diagram of the generator 105 and components thereof, in which various of the functionalities as discussed herein may be implemented and facilitated. It should be appreciated that the generator 105 may be an electric generator configured to generate electric power using a power source, such as a natural gas source or other type of power source. Generally, the generator 105 may comprise or be powered by a reciprocating engine which may use the expansion of natural gas to drive a set of pistons within a set of cylinders and convert the linear movement of the set of pistons to circular movement of a crankshaft to generate power.

The generator 105 may include the controller 106 as well as a memory 178. The memory 178 may store an operating system 179 capable of facilitating the functionalities as discussed herein as well as a set of applications 175 (i.e., machine readable instructions). For example, one of the set of applications 175 may be an operation application 190 configured to facilitate functionalities associated with determining how and when to dispatch power from the electric generator and generally managing the power to an associated property, as discussed herein. It should be appreciated that one or more other applications 192 are envisioned. For example, one of the other applications 192 may be an analysis application configured to collect and analyze various performance and usage data associated with operation of the generator 105.

The controller 106 may be implemented as a control module with a programmable logic controller (PLC) configured to interface with other components internal to and external from the generator 105, receive or access data and readings from the components, determine actions to facilitate based on the received/accessed data and readings, and instruct other components to facilitate certain actions. Additionally or alternatively, the controller 106 may be a processor configured to execute a set of computer-readable instructions, such as instructions associated with the set of applications 175.

The controller 106 may interface with the memory 178 to execute the operating system 179 and the set of applications 175. According to some embodiments, the memory 178 may also include other data 180 including static or real-time performance data associated with operation of the generator 105, historical energy usage data, rate data indicative of a cost of certain electric power (e.g., electric utility rate data), and/or other data. The memory 178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The generator 105 may further include a communication module 177 configured to communicate data via one or more networks (such as the network(s) 115 as discussed with respect to FIG. 1A). According to some embodiments, the communication module 177 may include one or more transceivers (e.g., WWAN, WLAN, and/or WPAN transceivers) functioning in accordance with IEEE standards, 3GPP standards, or other standards, and configured to receive and transmit data via one or more external ports 176. For example, the communication module 177 may communicate with the server 110 via the network(s) 115, as discussed with respect to FIG. 1A. Generally, the external port(s) 176 may be an Ethernet port or other type of wired or wireless data port.

The generator 105 may further include a user interface 174 configured to present information to a user and/or receive inputs from the user. In particular, the user interface 174 may include a display screen and various I/O components 183 (e.g., ports, capacitive or resistive touch sensitive input panels, keys, buttons, lights, LEDs). According to some embodiments, a user (e.g., an engineer or a customer) may facilitate certain operations of the generator 105 via the user interface 174 using various selections.

Additionally, the generator 105 may include a surge suppressor 181, a power conditioner 182, and a set of meters 183. The surge suppressor 181 may prevent damage to various components of the generator 105 from voltage spikes and the power conditioner 182 may improve the quality of the power that is dispatched from the generator 105. The set of meters 183 may include a utility power meter 184 that may measure the amount of utility power consumed by the property 117, a generator power meter 185 that may measure the amount of power dispatched from the generator 105 and consumed by the property 117, and a natural gas meter 186 that may measure the amount of natural gas used by the generator 105 to generate the generator power.

The generator 105 may further include a set of sensors 188, a protective relay(s) 189, and an alternator 195. According to embodiments, the set of sensors 188 may include a temperature sensor(s) (e.g., an ambient air temperature sensor and an internal air temperature sensor), a door contact sensor(s), and/or other sensors. The controller 106 may access or receive data from the set of sensors 188 and analyze the sensor data to determine how to facilitate and/or improve operation of the generator 105. The protective relay(s) 189 may handle faults that may occur during operation of the generator 105. The alternator 195 may generate electrical energy, for example using natural gas as a source, for dispatch from the generator 105.

Moreover, the generator 105 may include an automatic transfer switch 187 that may facilitate transfer of power output from the utility power source to the generator 105, and vice-versa. In particular, the controller 106 may analyze various data to determine how and when to supplement utility power with generator 105 power, and may instruct the automatic transfer switch 187 to facilitate the power source supplementing. It should be appreciated that other components associated with the generator 105 are envisioned.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the controller 106 (e.g., working in connection with the operating system 179) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Figure 2:
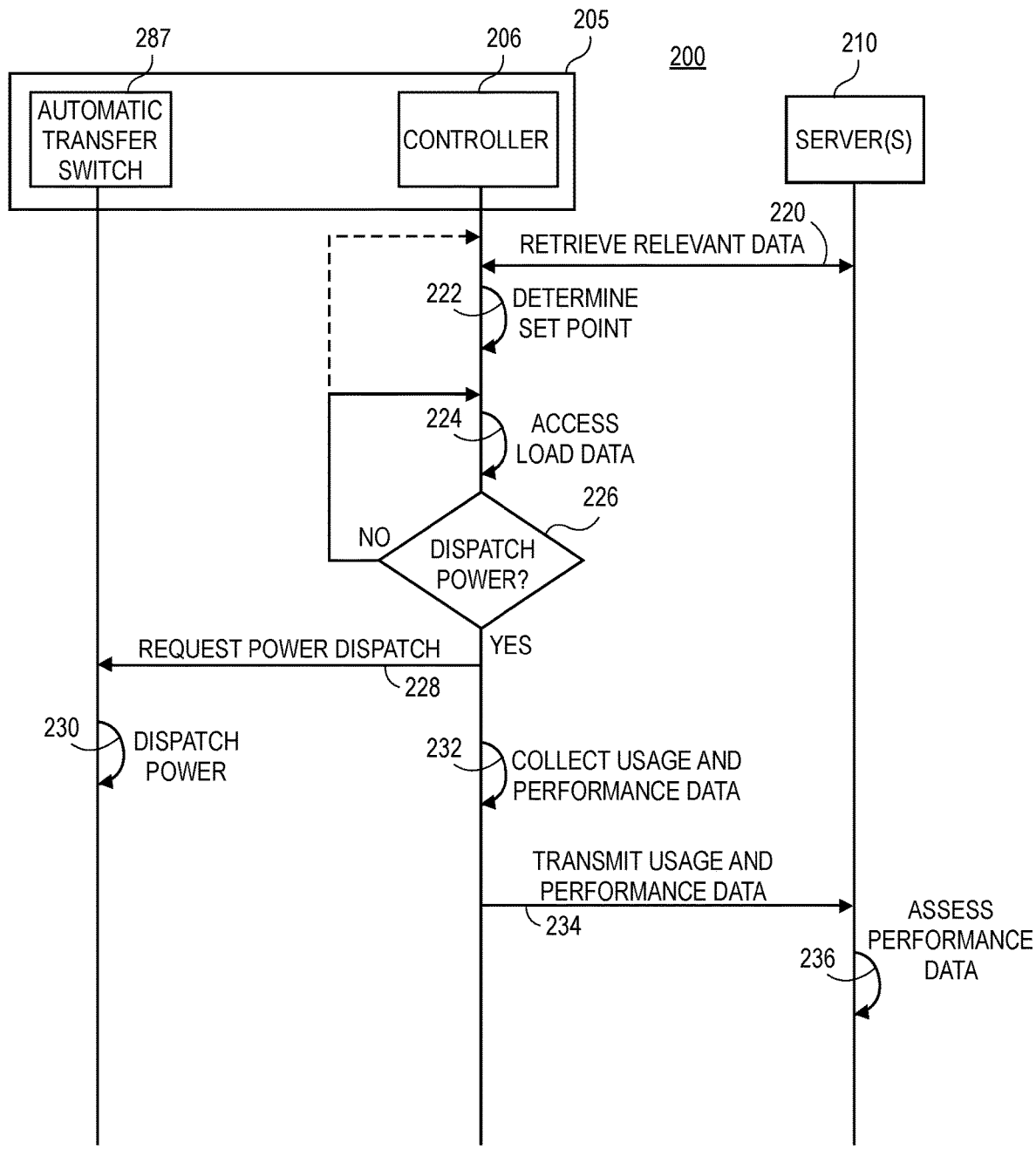
FIG. 2 depicts an exemplary signal diagram associated with determining how to dispatch energy from an electric generator, in accordance with some embodiments.

FIG. 2 depicts a signal diagram 200 associated with facilitating certain functionalities associated with the systems and methods. The signal diagram 200 includes a set of components that may be associated with electric power: a generator 205 (such as the generator 105 as discussed with respect to FIGS. 1A and 1B) having a controller 206 (such as the controller 106 as discussed with respect to FIGS. 1A and 1B) and an automatic transfer switch 287 (such as the automatic transfer switch 187 as discussed with respect to FIG. 1B); and one or more servers 210 (such as the server(s) 110 as discussed with respect to FIG. 1A). According to embodiments, the generator 205 may be disposed or located on a property owned and/or occupied by a customer, where the property may receive electric power via an electric utility (e.g., in normal operation) operated or managed by a utility provider. The generator 205 may be configured to additionally or alternatively supply electric power to the property.

The signal diagram 200 may begin when the controller 206 retrieves (220) relevant data from one or more of the server(s) 210 via one or more network connections. In particular, the controller 206 may access a set of historical energy usage data associated with the customer and/or the property, where the set of historical energy usage data may correspond to utility energy usage over various past time periods and from which a periodic usage rate may be determined (e.g., hourly, weekly, monthly, etc.). Accordingly, the set of historical energy usage data may indicate how much utility energy the customer typically uses across various time periods. The set of historical energy usage data may indicate conditions associated with the energy usage, such as external temperature and other metrics. Thus, the set of historical energy usage data may indicate how much utility energy was used across various situations. It should be appreciated that the controller 206 may retrieve the set of historical energy usage data from a server associated with the applicable utility provider, or the controller 206 may locally access the set of historical energy usage data, for example from an on-site utility meter or from local memory that may store the data.

Additionally, the controller 206 may access rate data associated with utility electric power. According to embodiments, the rate data may correspond to the cost or rate to consumer the utility electric power on a specific date or day or week, at a specific time, and/or over a specific time period. For instance, the rate data may be time-of-use pricing (TOU) (i.e., rate over set periods of time), real-time pricing (RTP) (i.e., usage on an hourly or other periodic basis), variable peak pricing (VPP) (i.e., defining pricing periods in advance where the rate various by utility and market conditions), critical peak pricing (CPP) (e.g., when the utility provider observes or anticipates higher wholesale market prices or power system emergency conditions), or other rate programs. It should be appreciated that the controller 206 may access the rate data directly from the utility provider (via a network connection), from another entity, or from locally-stored data. Further, it should be appreciated that the rate data may indicate the cost of the power used by the generator 205 to generate its electric power (e.g., the rate of the natural gas supplied to the generator 205).

The controller 206 may additionally access various performance characteristics or parameters associated with operation of the generator 205 and/or components thereof. In some situations, the performance characteristics may be static data indicating the capabilities of the generator 205, such as performance characteristics that may be included in the "specs" of the generator 205. In other situations, the performance characteristics may be real-time or near-real-time performance characteristics associated with current or past operation of the generator 205. Generally, the performance characteristics may indicate voltage output, power usage, electrical efficiency, stored power level, temperatures, engine diagnostic information, fuel consumption, customer utility load data, and/or other characteristics. The performance characteristics may also indicate the cost of operating the generator 205 (e.g., based on the cost of the natural gas or other resource that the generator 205 uses to generate electric power). Accordingly, the controller 206 may be able to determine, from the performance characteristics, how effectively the generator 205 and/or components thereof may operate across a given time period. For example, the controller 206 may determine the power output necessary to meet the estimated power requirements for the given time period. It should be appreciated that the controller 206 may access the performance characteristics from the server(s) 210 (e.g., a server associated with a manufacturer or supplier of the generator 205), or from locally-stored data. Further, it should be appreciated that any locally-stored data may be updated automatically due to any adjustments in operation of the generator 205.

After retrieving or accessing the relevant data, the controller 206 may determine (222) a set point for dispatching power from the generator 205 based on at least a portion of the relevant data. According to embodiments, the set point may correspond to a time, situation, or condition at or in which it is economically more efficient or effective for the generator 205 (versus the utility) to supply electrical power to the property. The set point may be an estimated or predicted (i.e., non-absolute) time, situation, or condition, where the economic benefit may be realized by the customer. For example, an economic benefit may be realized at or in a time, situation, or condition in which dispatching power from the generator 205 to the property is cheaper than the property receiving utility power.

For instance, assume that the rate of utility power peaks from 4:00 PM-9:00 PM on Monday through Friday for the month of July at a rate of twenty cents per kWh, the customer historically averages 1000 kWh of electrical power usage during those time periods on those days (i.e., a total cost of $1,000), and the estimated cost of dispatching 1000 kWh of electrical power from the generator 205 is $750, then the controller 206 can determine that operating the generator 205 at a cost of $0.15/kWh is less than buying the utility power at a cost of $0.20/kWh. In this instance, the controller 206 determines the set point to be the start of the utility power peak (i.e., at 4:00 PM on Monday through Friday), Additionally, the set point may indicate the end of the utility power peak (i.e., at 9:00 PM on each Monday through Friday in July), at which point the property may switch back from being at least partially supplied by generator 205 power to utility power.

Generally, the generator 205 may be configured to supplement the electricity being consumed by a property (e.g., the property 117). For example, if the property has a peak usage rate of 1000 kWh, the generator 205 may supply 720 kWH of the 1000 kWh being consumed by the property. Accordingly, the property may experience a savings on the 720 kWh being supplied by the generator 205 (while receiving another 280 kWh in utility power). It should be appreciated that, in some scenarios (e.g. a power outage), power from the generator 205 may completely replace utility power.

At 224, the controller 206 may access load data associated with the utility electric power. In embodiments, the load data may indicate a current utility electric load (e.g., an amount or rate) currently being used by the property, a predicted utility electric load to be used by the property across a given time period (e.g., based on historical usage data and/or predicted conditions such as temperature, time of day, etc.), and/or other metrics. In some situations, the controller 206 may use the load data to determine whether the set point determined in (222) is triggered or reached. For example, the set point may indicate that once the utility load reaches a certain threshold amount, power from the generator 205 should be dispatched.

At 226, the controller 206 may determine whether to dispatch power from the generator 205. In particular, the controller 206 may determine to dispatch the power based on the set point determined in (222), and optionally on the load data accessed in (224) and/or a current capacity of the generator 205 (or another operating status parameter of the generator 205). In one scenario, the controller 206 may determine that the accessed load data aligns with one or more parameters of the determined set point. For example, if the determined set point indicates that power from the generator 205 should be dispatched when a threshold utility electric load is exceeded, the controller 206 should determine to dispatch the power from the generator 205 when the current utility electric load exceeds the threshold utility electric load.

In another scenario, the controller 206 may previously determine the set point to dispatch the power from the generator 205 to be every weekday evening from 5:00 PM-8:00 PM, which may be independent of any current utility electric load. Accordingly, on each weekday evening at 5:00 PM, the controller 206 may determine to dispatch the power from the generator 205. According to embodiments, the controller 206 may account for the power capacity and/or other current operation parameters of the generator 205 when determining whether to dispatch the power. For example, the controller 206 may determine to dispatch power from the generator 205 if the current power capacity of the generator 205 is sufficient to meet an anticipated amount of power across a time period for which the power from the generator 205 is to be dispatched.

If the controller 206 determines to not dispatch power from the generator 205 ("NO"), processing may return to (224) in which the controller 206 may access updated load data associated with the utility electric power. In an alternative embodiment, processing may return to (220) or to (222) in which updated data may be retrieved and/or an updated set point may be determined.

If the controller 206 determines to dispatch power from the generator 205 ("YES"), the controller 206 may request (228) the automatic transfer switch 287 to dispatch power. Accordingly, the automatic transfer switch 287 may cause (230) the power to be dispatched such that the property is being partially (or fully) powered by the power dispatched from the generator 205. In particular, the automatic transfer switch 287 may cause the utility power to be at least partially ceased and may activate deployment of power from the generator 205. It should be appreciated that the automatic transfer switch 287 may cease dispatching power from the generator 205, at which point utility electric power may be used by the property, at any time and in response to any condition or trigger, such as a condition or trigger as indicated by the set point determined in (222).

During operation of the generator 205 (i.e., when power is being dispatched from the generator 205), the controller 206 may collect (232) usage and performance data, such as from a set of sensors and/or other components of the generator 205. According to embodiments, the usage and performance may include various metrics associated with operation of the generator 205, including voltage output, power usage, electrical efficiency, stored power level, temperatures, engine diagnostic information, fuel consumption, customer utility load data, and/or other characteristics or metrics.

At 234, the controller 206 may transmit the collected usage and performance data to the server(s) 210 via one or more network connections. It should be appreciated that the controller 206 may transmit the collected data in real-time or near-real-time as the data is collected, or at set intervals. The server 210 may assess or analyze (236) the performance data for various purposes. For example, the server 210 may analyze the data for research and development purposes, customer service purposes (e.g., troubleshooting), determining improvements in operation of the generator 205 (e.g., optimizing the determination of the set point(s)), and/or other purposes.

It should be appreciated that the customer (or generally, a user or individual) may manually configure various operational aspects of the generator 205. For example, the customer may configure the generator 205 to dispatch power at a certain time or date, and/or across a certain time period, regardless of any economic benefit that may be realized or not realized. According to aspects, the customer may configure the generator 205 on-site via a user interface or remotely via an electronic device communicating with the generator 205 via a network connection.

Figure 3:
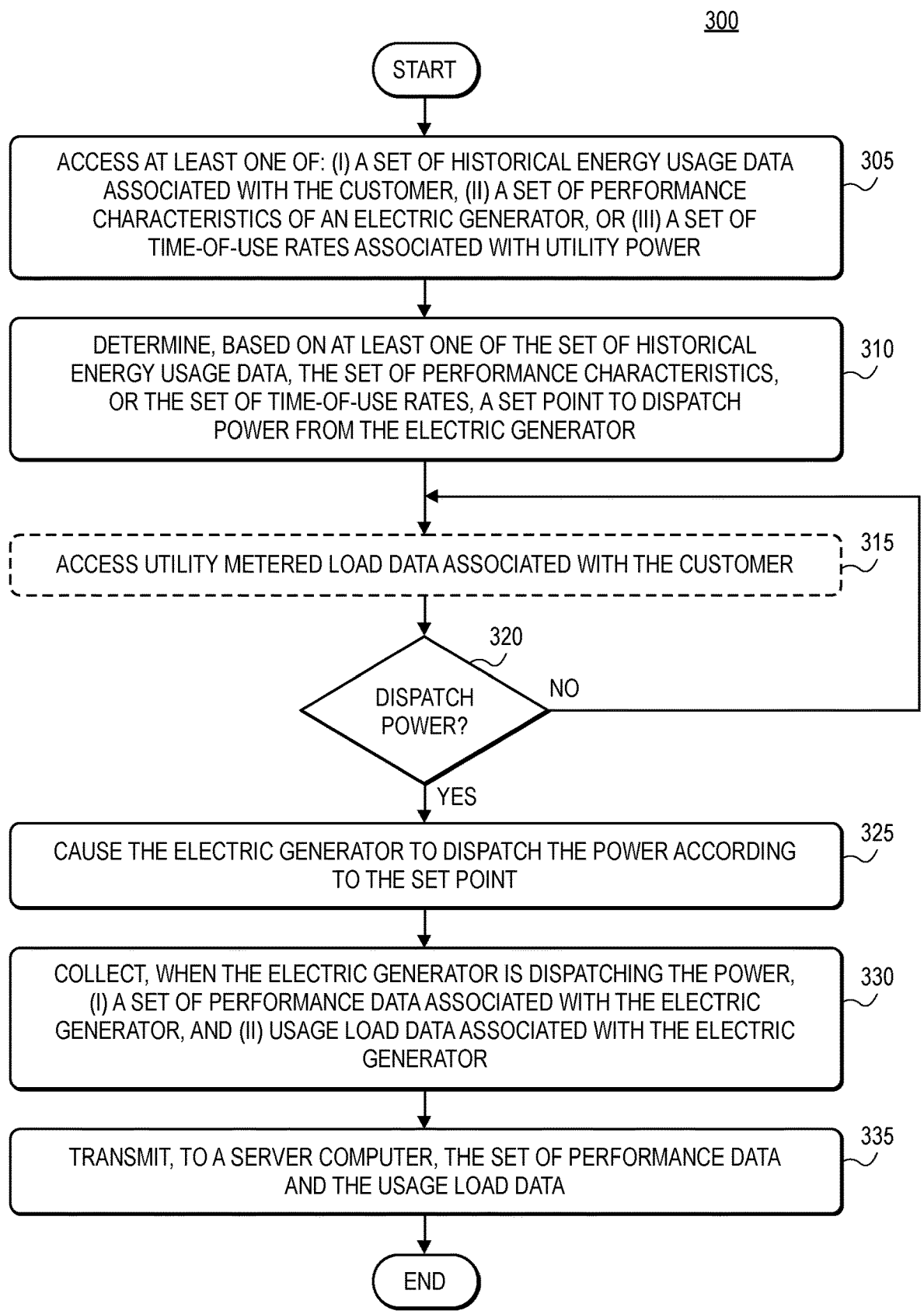
FIG. 3 depicts an exemplary flow diagram associated with determining how to dispatch energy from an electric generator, in accordance with some embodiments.

FIG. 3 depicts a block diagram of an exemplary method 300 of determining how to dispatch energy from an electric generator for a customer. The method 300 may be facilitated by a controller associated with the electric generator, where the controller may communicate with a backend server to access and retrieve relevant data. The controller may support execution of a dedicated application that may facilitate the functionalities of the method 300.

The method 300 may begin when the controller accesses (block 305) at least one of (i) a set of historical energy usage data associated with the customer, (ii) a set of performance characteristics of the electric generator, or (iii) a set of time-of-use rates associated with utility power. According to embodiments, the controller may access various portions of this data from the backend server or other local or remote entity, from local storage, or from a combination thereof.

The controller may determine (block 310), based on the at least one of (i) the set of historical energy usage data associated with the customer, (ii) the set of performance characteristics of the electric generator, or (iii) the set of time-of-use rates associated with utility power, a set point to dispatch power from the electric generator. According to embodiments, the controller may initially determine, based on the at least one of (i) the set of historical energy usage data associated with the customer, (ii) the set of performance characteristics of the electric generator, or (iii) the set of time-of-use rates associated with utility power, a set of financial benefits to the customer of dispatching the power from the electric generator. For example, the set of financial benefits may indicate a first cost associated with continued use of the utility power and a second cost associated with dispatching the power from the electric generator. The controller may also determine, based on the set of financial benefits, the set point to dispatch power from the electric generator. For example, the set point may correspond to when it is more cost effective (as indicated in the set of financial benefits) to dispatch the power from the electric generator versus continued use of the utility power.

The controller may optionally access (block 315) utility metered load data associated with the customer. In embodiments, the utility metered load data may indicate a past and/or current usage level by the customer of the utility power, which the controller may additionally use to determine the set point and/or determine when to dispatch the power from the electric generator.

The controller may determine (block 320) whether to dispatch the power from the electric generator. In embodiments, the controller may determine to dispatch the power from the electric generator at the set point determined in block 310. Additionally or alternatively, the controller may account for the utility metered load data when determining whether to dispatch the power from the electric generator. For example, if the set point indicates to dispatch the power when a certain utility power usage rate meets a threshold amount, the controller may determine to dispatch the power when the utility metered data is at least the threshold amount. In a scenario, the controller may determine to dispatch the power from the electric generator independent of the determined set point and/or the utility metered load data. For example, the controller may determine to dispatch the power from the electric generator in response to detecting a utility power outage. If the controller determines to not dispatch the power from the electric generator ("NO"), processing may return to block 315 (or block 305), end, or proceed to other functionality.

In contrast, if the controller determines to dispatch the power from the electric generator ("YES"), the controller may cause (block 325) the electric generator to dispatch the power according to the set point. Accordingly, the controller may facilitate a transition from the associated property receiving utility power to receiving power from the electric generator. In some implementations, the associated property may continue to receive some utility power in addition to receiving the power from the electric generator.

When the electric generator is dispatching the power, the controller may collect (block 330) (i) a set of performance data associated with the electric generator, and (ii) usage load data associated with the electric generator. According to embodiments, the controller may collect the set of performance data from a set of sensors disposed within the electric generator. Additionally, the usage load data may indicate an amount of power being output by the electric generator, among other metrics or data.

The controller may transmit (block 335), to a server computer, the set of performance data and the usage load data. According to embodiments, the server computer may monitor a performance of the electric generator based on the set of performance data, and/or may audit, from the usage load data, a financial performance associated with use of the electric generator. Accordingly, the server computer may determine how to improve the electric generator, and/or improve the operation of the electric generator.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC))

to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of determining how to dispatch energy from a generator for a customer, the method comprising:

accessing (i) a set of historical energy usage data associated with the customer or rate data associated with utility power, and (ii) a set of performance characteristics of the generator;

determining, by a controller of the generator based on (i) the set of historical energy usage data or the rate data, and (ii) the set of performance characteristics, a set point to dispatch power from the generator;

accessing, by the controller, utility metered load data associated with the customer; and based on the utility metered load data, requesting, by the controller, an automatic transfer switch of the generator to activate dispatching of the power from the generator according to the set point.

2. The computer-implemented method of claim 1, wherein accessing the rate data comprises:

accessing a set of time-of-use rates associated with the utility power.

3. The computer-implemented method of claim 1, wherein determining the set point to dispatch the power from the electrical generator comprises:

determining, by the controller based on (i) the set of historical energy usage data or the rate data, and (ii) the set of performance characteristics, a set of financial benefits to the customer of dispatching the power from the generator; and determining, by the controller based on the set of financial benefits, the set point to dispatch power from the generator.

4. The computer-implemented method of claim 1, further comprising:

collecting, by the controller when the generator is dispatching the power, a set of performance data associated with the generator.

5. The computer-implemented method of claim 4, wherein collecting the set of performance data associated with the generator comprises:

collecting the set of performance data from a set of sensors disposed within the electronic generator.

6. The computer-implemented method of claim 1, further comprising:

collecting, by the controller when the generator is dispatching the power, usage load data associated with the generator.

7. The computer-implemented method of claim 1, further comprising:

detecting an outage associated with utility power; and
in response to detecting the outage, causing the generator to dispatch the power.

8. A generator comprising:

a memory storing a set of performance characteristics associated with the generator;

a transceiver configured to communicate with a server via at least one network connection;

an automatic transfer switch; and a controller interfaced with the memory, the transceiver, and the automatic transfer switch, and configured to:

access, via the transceiver, a set of historical energy usage data associated with a customer or a set of rate data associated with utility power, determine, based on (i) the set of performance characteristics and (ii) the set of historical energy usage data or the rate data, a set point to dispatch power from the generator, access utility metered load data associated with the customer, and based on the utility metered load data, request the automatic transfer switch to activate dispatching of the power from the generator according to the set point.

9. The generator of claim 8, wherein the controller is further configured to:

collect usage load data associated with the generator, and
transmit, via the transceiver, the usage load data.

10. The generator of claim 9, wherein the server computer audits, from the usage load data, a financial performance associated with use of the generator.

11. The generator of claim 8, wherein the controller is further configured to:

collect a set of performance data associated with dispatching the power.

12. The generator of claim 11, further comprising:

a set of sensors;
wherein the controller collects the set of performance data from the set of sensors.

13. The generator of claim 8, wherein to determine the set point to dispatch the power from the generator, the controller is configured to:

determine, based on (i) the set of performance characteristics and (ii) the set of historical energy usage data or the rate data, a set of financial benefits to the customer of dispatching the power from the generator, and determine, based on the set of financial benefits, the set point to dispatch the power from the generator.

14. The generator of claim 8, wherein the controller is further configured to:

detect an outage associated with the utility power, and
in response to detecting the outage, dispatch the power.

15. A computer-implemented method of dispatching energy from a generator for a customer, the method comprising:

accessing (i) a set of historical energy usage data associated with the customer or a set of rate data associated with utility power, and (ii) a set of performance characteristics of the generator;

determining, by a controller of the generator based on (i) the set of historical energy usage data or the rate data, and (ii) the set of performance characteristics, a set point to dispatch power from the generator; and at the set point, request, by the controller, an automatic transfer switch of the generator to activate dispatching of the power from the generator.

16. The computer-implemented method of claim 15, wherein accessing the set of rate data comprises:

accessing a set of time-of-use rates associated with the utility power.

17. The computer-implemented method of claim 15, wherein determining the set point to dispatch the power from the electrical generator comprises:

determining, by the controller of the generator based on (i) the set of historical energy usage data or the rate data, and (ii) the set of performance characteristics, a set of financial benefits to the customer of dispatching the power from the generator; and determining, by the controller based on the set of financial benefits, the set point to dispatch power from the generator.

18. The computer-implemented method of claim 15, further comprising:

collecting, by the controller when the generator is dispatching the power, (i) usage load data associated with the generator, and (ii) a set of performance data associated with the generator; and transmitting, via a transceiver to a server computer, the set of performance data and the usage load data, wherein the server computer (i) monitors a performance of the generator based on the set of performance data, and (ii) audits, from the usage load data, a financial performance associated with use of the generator.

19. The computer-implemented method of claim 18, wherein collecting the set of performance data associated with the generator comprises:
   collecting the set of performance data from a set of sensors disposed within the electronic generator.

20. The computer-implemented method of claim 15, further comprising:
   detecting an outage associated with the utility power; and
   in response to detecting the outage, causing the generator to dispatch the power.

\* \* \* \* \*